United States Patent
Chen (10) Patent No.: US 7,613,854 B2
(45) Date of Patent: Nov. 3, 2009

(54) KEYBOARD VIDEO MOUSE (KVM) SWITCH WHEREIN PERIPHERALS HAVING SOURCE COMMUNICATION PROTOCOL ARE ROUTED VIA KVM SWITCH AND CONVERTED TO DESTINATION COMMUNICATION PROTOCOL

(75) Inventor: Sun-Chung Chen, Taipei Hsien (TW)

(73) Assignee: Aten International Co., Ltd, Hsichih (TW)

( * ) Notice: Subject to any disclaimer, the term of this patent is extended or adjusted under 35 U.S.C. 154(b) by 971 days.

(21) Appl. No.: 10/824,493

(22) Filed: Apr. 15, 2004

(65) Prior Publication Data

US 2005/0231462 A1 Oct. 20, 2005

(51) Int. Cl.
G06F 3/00 (2006.01)
G06F 5/00 (2006.01)
G06F 13/00 (2006.01)

(52) U.S. Cl. .................. 710/62; 710/8; 710/9; 710/10; 710/15; 710/38; 710/64; 710/72; 710/73; 710/300; 710/316; 703/24; 703/25

(58) Field of Classification Search ................. 710/316, 710/8–10, 62, 38, 72, 73, 15, 64, 300; 709/223, 709/249; 345/603; 703/24, 25
See application file for complete search history.

(56) References Cited

U.S. PATENT DOCUMENTS

| | | | |
|---|---|---|---|
| 5,669,015 A * | 9/1997 | Chidester et al. ............... 710/73 |
| 5,721,842 A | 2/1998 | Beasley et al. | |
| 6,185,643 B1 | 2/2001 | Kirshtein et al. | |
| 6,324,605 B1 | 11/2001 | Rafferty | |
| 6,345,323 B1 | 2/2002 | Beasley | |
| 6,378,009 B1 | 4/2002 | Pinkston, II et al. | |
| 6,378,014 B1 | 4/2002 | Shirley | |
| 6,539,418 B2 | 3/2003 | Schneider et al. | |
| 6,549,966 B1 * | 4/2003 | Dickens et al. ............... 710/300 |
| 6,567,869 B2 | 5/2003 | Shirley | |
| 6,609,034 B1 * | 8/2003 | Behrens et al. ............... 700/19 |

(Continued)

FOREIGN PATENT DOCUMENTS

GB 2350212 A 11/2000

(Continued)

OTHER PUBLICATIONS

Petition for invalidation of TW Patent Application No. 093105958, submitted to the Taiwan Intellectual Property Office on Sep. 11, 2007.

(Continued)

*Primary Examiner*—Tammara Peyton
(74) *Attorney, Agent, or Firm*—Chen Yoshimura LLP (57) ABSTRACT

A plurality of local and remote computers share a plurality of local manipulating devices, and the connection agreements of the computers and the manipulating devices are different. First electrical signals from these manipulating devices are received, and each of the first electrical signals complies with the connection agreement of its source manipulating device. Each first electrical signal is then converted to a standard packet. The paths of these standard packets are routed between the manipulating devices and the computers. Afterwards, each standard packet is converted to a second electrical signal which complies with the connection agreement of its destination computer.

21 Claims, 6 Drawing Sheets

U.S. PATENT DOCUMENTS

| | | | |
|---|---|---|---|
| 6,618,774 B1 * | 9/2003 | Dickens et al. | 710/64 |
| 6,671,756 B1 | 12/2003 | Thomas et al. | |
| 6,880,002 B2 * | 4/2005 | Hirschfeld et al. | 709/223 |
| 6,931,475 B2 * | 8/2005 | Huang et al. | 710/316 |
| 7,281,067 B2 * | 10/2007 | Chen | 710/62 |
| 7,502,230 B2 * | 3/2009 | Chang et al. | 361/752 |
| 2002/0143996 A1 | 10/2002 | Odryna et al. | |
| 2003/0005186 A1 | 1/2003 | Gough et al. | |
| 2003/0041209 A1 | 2/2003 | Kirshtein | |
| 2003/0131127 A1 | 7/2003 | King et al. | |
| 2004/0075638 A1 * | 4/2004 | Han | 345/156 |
| 2005/0052465 A1 * | 3/2005 | Moore et al. | 345/603 |
| 2005/0063108 A1 | 3/2005 | Voll et al. | |
| 2005/0066000 A1 * | 3/2005 | Liaw et al. | 709/204 |
| 2005/0138229 A1 * | 6/2005 | Sartore | 710/15 |
| 2005/0138245 A1 * | 6/2005 | Chen | 710/62 |
| 2005/0216620 A1 * | 9/2005 | Sandulescu et al. | 710/62 |

FOREIGN PATENT DOCUMENTS

| | | |
|---|---|---|
| JP | 2003-534685 | 11/2003 |
| TW | 539173 | 5/2001 |
| TW | 555082 | 12/2002 |
| TW | 522329 | 3/2003 |
| TW | 544617 | 8/2003 |
| TW | 578084 | 3/2004 |
| WO | WO 01/84291 | 11/2001 |
| WO | WO 02/80017 A1 | 3/2002 |

OTHER PUBLICATIONS

Petition for invalidation of TW Patent Application No. 093105958, submitted to the Taiwan Intellectual Property Office on Jun. 30, 2008.

* cited by examiner

KEYBOARD VIDEO MOUSE (KVM) SWITCH WHEREIN PERIPHERALS HAVING SOURCE COMMUNICATION PROTOCOL ARE ROUTED VIA KVM SWITCH AND CONVERTED TO DESTINATION COMMUNICATION PROTOCOL

BACKGROUND OF THE INVENTION

1. Field of Invention

The invention relates to a switch device and, in particular, to a KVM switch for multiple chaining and with high compatibility and the method thereof.

2. Related Art

With the rapid development in information technology, computers and their peripherals become very popular. Computer users often use the mouse and keyboard to control the computers. Through the monitors or speakers, the computer users can monitor the state of the computers. Sometimes a user may have more than one computer to process different types of things. Traditionally, each computer is equipped with one set of input/output (IO) peripheral devices, including the keyboard, mouse, monitor, and speakers. However, this is a waste of money and space if one has several computers.

On the other hand, large system businesses or enterprise internal networks often involve tens to thousands servers. Each server needs a monitor, a keyboard and a mouse to for management. In practice, one rarely needs to manipulate these devices. Most of the time, the servers do not need to be controlled by the manager. In this situation, it is totally unnecessary, costly, and wasting the space to have a set of IO peripheral devices for each server.

Therefore, a keyboard video mouse (KVM) switch is proposed to use at least one set of operation device to manage several computers. Using the KVM switch does not only solve the cost problem, it simultaneously solves the problems of equipment and space. It may also conquer the compatibility problem among different interfaces.

However, due to the hardware design and cost restriction of an individual KVM switch, the number of manipulating devices and computers it can accommodate is limited. On the other hand, it is not easy to connect conventional KVM switches together. When several manipulating devices simultaneously access multiple computers, the connection agreements among the manipulating devices and computers are often different. The commonly used connection agreements include the universal serial bus (USB) interface, the serial port (COM) interface, or the personal system/2 (PS/2) interface.

The different connection agreements will reduce the compatibility of the KVM switches and the signal exchange efficiency among them. For example, when the connection agreement of the keyboard is the USB interface while that of the computer is the PS/2 interface, the conventional KVM switch usually converts the electrical signal to/from the keyboard to be PS/2 compatible.

Nevertheless, such a method is not suitable for multiple chaining KVM switches. If they need to transmit electrical signals in different connection agreements, their circuits have to be able to understand various connection agreements. This does not only increase the design difficulty, the compatibility is still an issue that serious reduce its efficiency.

The above-mentioned drawbacks result in a lot of inconvenience in practical uses. For large system businesses or the internal networks of mid-size enterprises, in particular, if the KVM switches cannot simultaneously support a large number of manipulating devices and computers, they do not only increase the costs for constructing and maintaining the system but also reduce the communication efficiency of the whole network.

SUMMARY OF THE INVENTION

An objective of the invention is to provide a KVM switch to improve the compatibility when there are different connection agreements. It further enables multiple chaining of KVM switches and thus allows connections to more manipulating device and computers. The invention also reduces the design difficulty.

Another objective of the invention is to provide a computer switching method to improve the data exchange efficiency, compatibility, and extensibility of the KVM switches. The connected KVM switches can thus rapidly exchange data.

Pursuant to the above objectives, this specification discloses a KVM switch and the method thereof. A plurality of local and remote computers share a plurality of local manipulating devices using a plurality of KVM switches, where the connection agreements of the computers and the manipulating devices are different. A plurality of first electrical signals of the manipulating devices are received, where each of the first electrical signals complies with the connection agreement of the source manipulating device. Each of he first electrical signals is converted into a standard packet. The paths of the standard packets are routed between the manipulating devices and the computers. Afterwards, each of the standard packets is converted into a second electrical signal that complies with the connection agreement of the destination computer.

The disclosed KVM switch contains at least a plurality of first interfaces, a switch device, and a plurality of second interfaces. The first interfaces are connected to the manipulating devices to receive the first electrical signals, each of which complies with the connection agreement of the source manipulating device. Each first interface has a first converting device to convert the first electrical signal into a standard packet.

The switch device determines the paths of the standard packets between the manipulating devices and the computers according to a path selection setting. The second interfaces are connected to the computers. Each second interface has a second converting device to convert the standard packet received from the switch device into a second electrical signal that complies with the connection agreement of the connected computer.

According to a preferred embodiment of the invention, the switch device contains a central processing unit (CPU). Each of the electrical signals is selected from a keyboard signal and a mouse signal. The first interfaces contain several universal asynchronous receivers/transmitters (UART's), a half-duplex communication processor, and a CPU. The second interfaces also contain several UART's, a half-duplex communication processor, and a CPU.

According to another embodiment of the invention, when the KVM switch provides a plurality of local and remote computers to share a plurality of local manipulating devices, the KVM switch further contains a packet encoding device, a network device, and a packet decoding device. The packet encoding device generates at least one network packet that contains a plurality of data sections correspondingly storing the standard packets of the first interfaces according to the standard packet.

The network device communicates with another KVM switch using a network protocol in order to transmit network packets and to receive network packets from another KVM switch. The packet decoding device obtains at least one remote standard packet from the network packet transmitted by another KVM switch.

According to the preferred embodiment, the network packet has a network overhead section. When the path destinations of the standard packets are the remote computers connected to the same remote KVM switch, the standard packets are encoded into a single network packet. The packet encoding device contains a CPU; the packet decoding device also contains a CPU. They may share the same CPU for both encoding and decoding.

The network device contains a network interface chip (NIC) and a network switch. The NIC connects to the packet encoding device and the packet decoding device. The network switch has a first port, a second port, and a third port. The first port connects to the NIC. One of the second and third ports is for the connection of another KVM switch. The network device further contains a two-way switch connected to the second port for switching between the Ethernet and another KVM switch.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
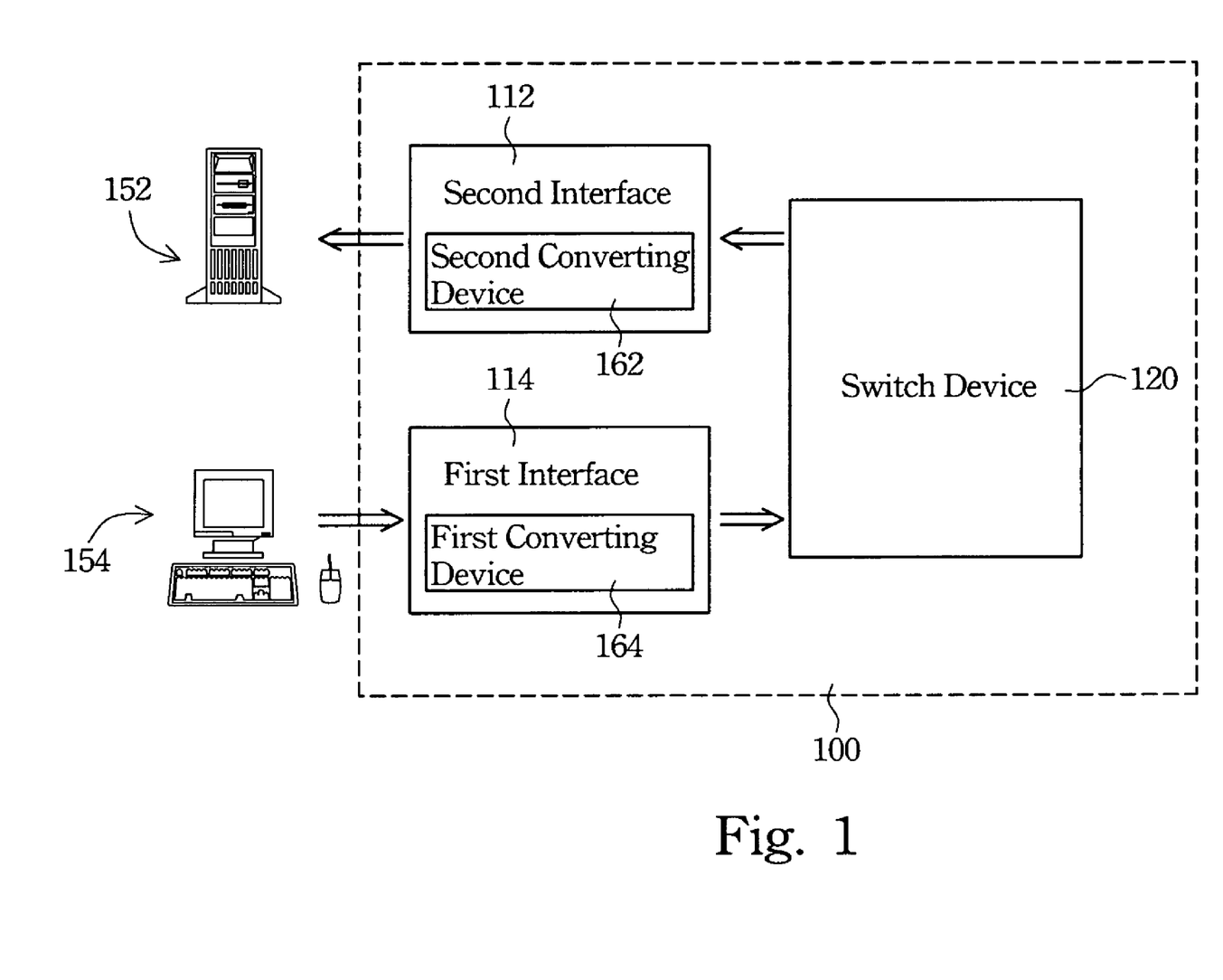
FIG. 1 is a schematic view of a preferred embodiment of the invention.

For demonstration purposes, we draw only one first interface 114 and one second interface 112 in FIG. 1. The keyboard video mouse (KVM) switch 100 uses several first interfaces 114 (such as the USB, COM, PS/2, infrared, Bluetooth, or other wired and wireless interfaces) to connect to several local manipulating devices 154 (such as keyboards and mice) for electrical signal communications. In this case, the electrical signals comply with the connection agreement of the source local manipulating devices 154.

The first interface 114 has a first converting device 164 for converting the electrical signal into a standard packet to be fed into a switch device 120 for routing. The switch device 120 (e.g. a switch chip, programmable chip or CPU) transmits the standard packet to the second interface 112 of its destination, and thus to the local computer 152 of its destination, according to a path selection setting.

Several second interfaces 112 (such as the USB, COM, PS/2, infrared, Bluetooth, or other wired and wireless interfaces) are connected with several local computers 152. The second interface has a second converting device 162 for converting the standard packet into an electrical signal that complies with the connection agreement of the local computer 152 of its destination.

Simply speaking, when an electrical signal is transmitted from the local manipulating device 154 to the first interface 114, it is first converted by the first converting device 164 into a standard packet. After being routed by the switch device 120, the standard packet is sent to the second interface 112 of its destination. The second converting device 162 then converts the standard packet into an electrical signal for the local computer 152.

The standard packet transmitted by the KVM switch 100 complies with a predetermined or manufacturer defined connection agreement or format. The electrical signals transmitted at the first interface 114 and the second interface 112 comply with the connection agreements of the local manipulating devices 154 and the local computers 152 they connect to. The two interfaces 112, 114 convert electrical signals of different connection agreements into the standard packet of the same connection agreement.

Within this structure, aside from the two interfaces 112, 114, one does not need to worry about the compatibility issue in the circuit design of other parts of the KVM switch 100. Therefore, the invention not only increases the data exchange efficiency and compatibility, but also reduces the design complexity and product costs.

Figure 2:
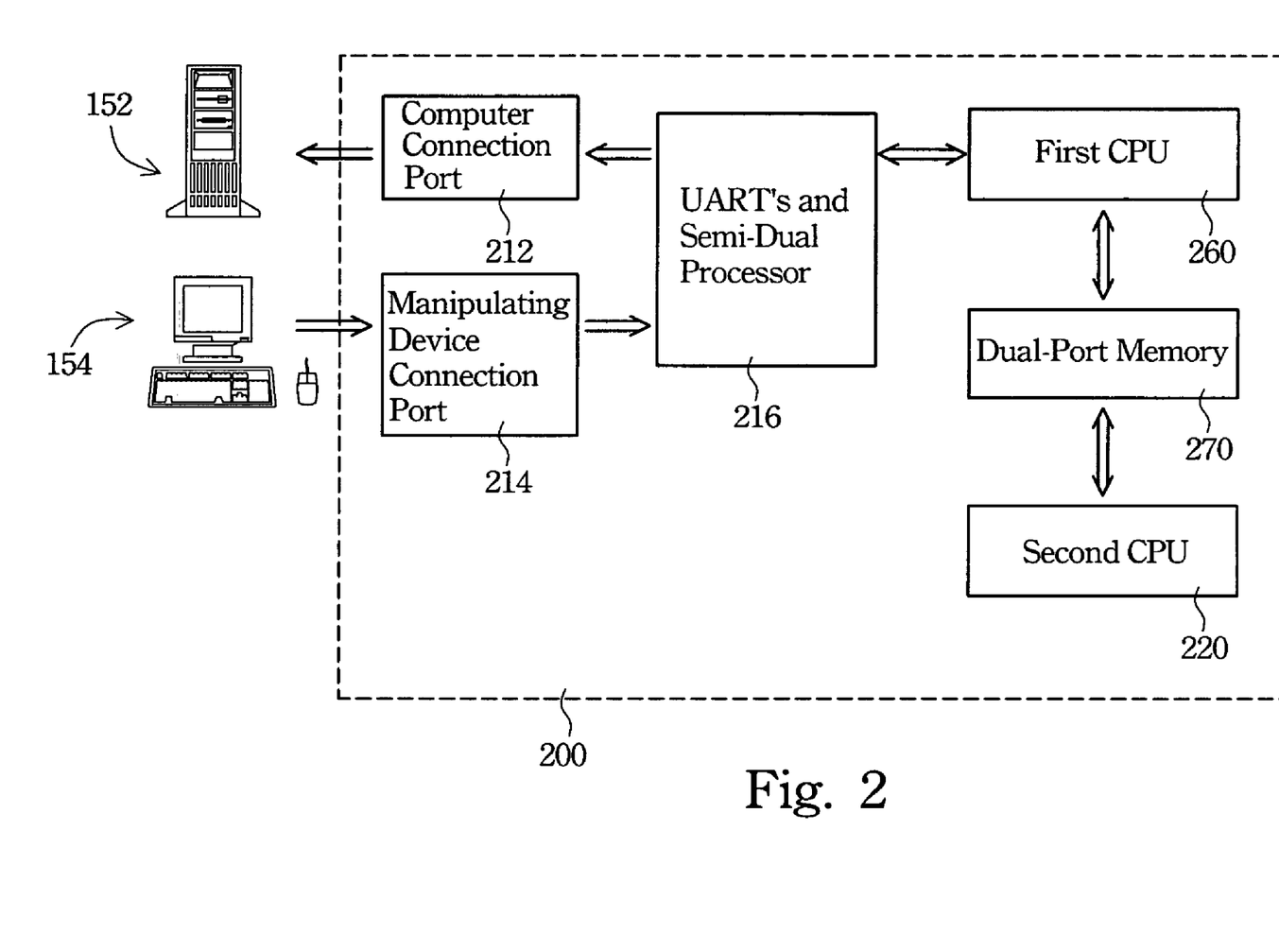
FIG. 2 is a schematic view of FIG. 1 implemented in practice.

In FIG. 2, several second interfaces 112 connect to several local computers 152 via several computer connection ports 212. The connection agreement of each of the computer connection ports 212 is the same as that of the connected local computer 152. Several first interfaces 114 connect to several local manipulating devices 154 via several manipulating device connection ports 214. The connection agreement of each of the manipulating device connection ports 214 is the same as that of the connected local manipulating device 154. For demonstration purposes, we draw only one manipulating device connection port 214 and computer connection port 212 in FIG. 2.

The electrical signals between the local computer 152 and the KVM switch 200 are transmitted using a set of universal asynchronous receivers/transmitters (UART's) and half-duplex communication processor 216. The electrical signals between the local manipulating devices 154 and the KVM switch 200 are also transmitted using the same set of universal asynchronous receivers/transmitters (UART's) and half-duplex communication processor 216.

The KVM switch 200 in the preferred embodiment can simultaneously connect to 32 local computers 152 and four local manipulating devices 154. That is, the KVM switch 200 has 32 computer connection ports 112 and 4 manipulating device connection ports 114. Therefore, it requires four 9-port UART's and one half-duplex communication processor for electrical signal transmissions. The half-duplex communication processor can be replaced by a more expensive full-duplex communication processor or some other suitable processor.

The manipulating device connection port 214 is the first converting device 164 while the computer connection port 212 is the second converting device 162. The CPU of them processes conversions between electrical signals and standard packet that have different connection agreements. The standard packet complies with the predetermined connection agreement, such as the USB connection agreement, or manufacturer defined format. This unifies the connection agreement used in the KVM switch 200. The data transmission speed and efficiency can also be increased through appropriate designs.

Moreover, the preferred embodiment provides a first CPU 260 and a dual-port memory 270 in order to quickly process data exchanges between the manipulating device connection port 214, the computer connection port 212 and the second CPU 220. All the data from the manipulating device connection port 214 and the computer connection port 212 are transmitted via the dual-port memory in a parallel format. That is, all data can individually and simultaneously pass the dual-port memory 270.

The switch device 120 uses the second CPU 220 to arrange the path routing of the standard packet according to a path selection setting (e.g. a routing table) stored in a storage medium. The second CPU 220 transmits the standard packet to the local computer 152 of the destination. Afterwards, the standard packet is transmitted via the UART's and half-duplex communication processor 216 to the computer connection port 212 of its destination. After being converted into electrical signals complying with the connection agreement of the local computer 152 of its destination, it is further transmitted to the local computer 152 of its destination.

Figure 3:
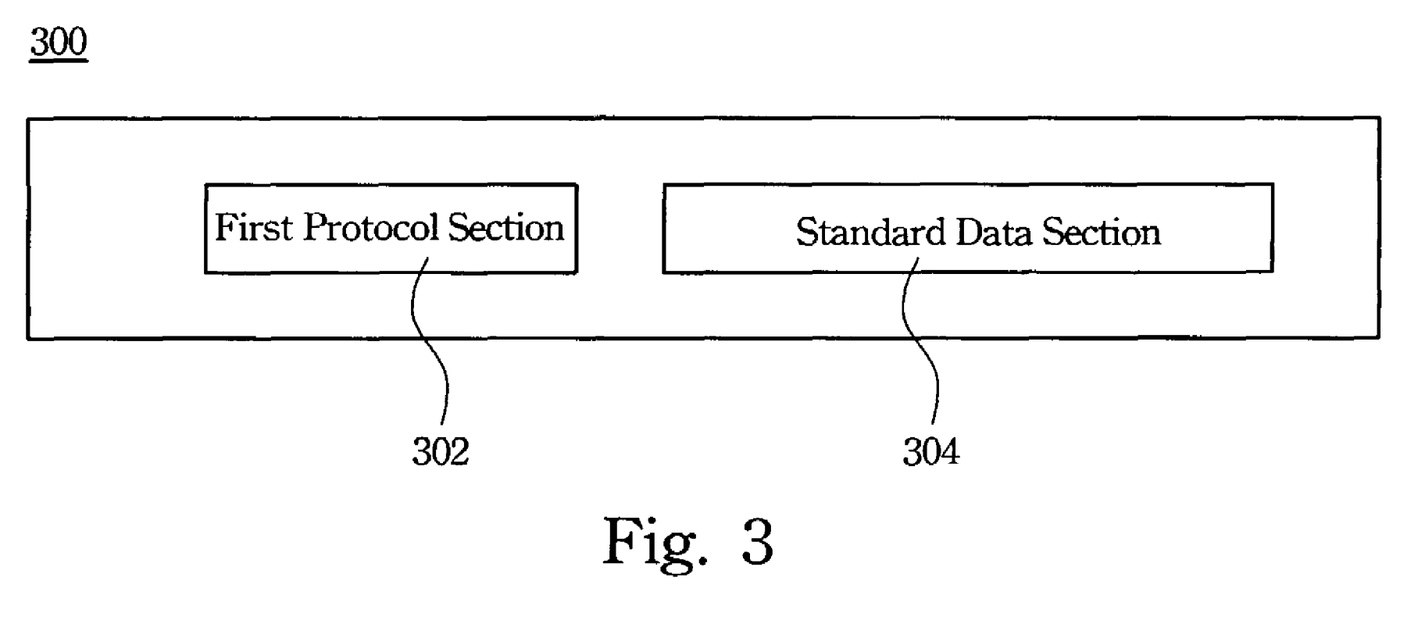
FIG. 3 is a schematic view of the standard packet in FIG. 2.

As shown in FIG. 3, the standard packet 300 contains a first protocol section 302 and a standard data section 304. The first protocol section 302 stores protocol codes, defining the packet protocol of the standard packet 300. The standard data section 304 follows the predetermined or manufacturer defined connection agreement or format to store the electrical signals of local manipulating devices 154, such as the keyboard and mouse. The standard data section 304 of the standard packet transmitted from the local computer 152 to the local manipulating deice 154 also satisfies the above rules.

The disclosed KVM switch unifies the connection agreement used inside the KVM switch to increase the data transmission speed and efficiency. Aside from the interfaces of the computers and the manipulating devices, the designs of other circuits inside the KVM switch do not require one to take into account the connection agreement compatibility issue. Therefore, the invention not only increases the data exchange efficiency and compatibility, but also reduces the design complexity and product costs.

Figure 4:
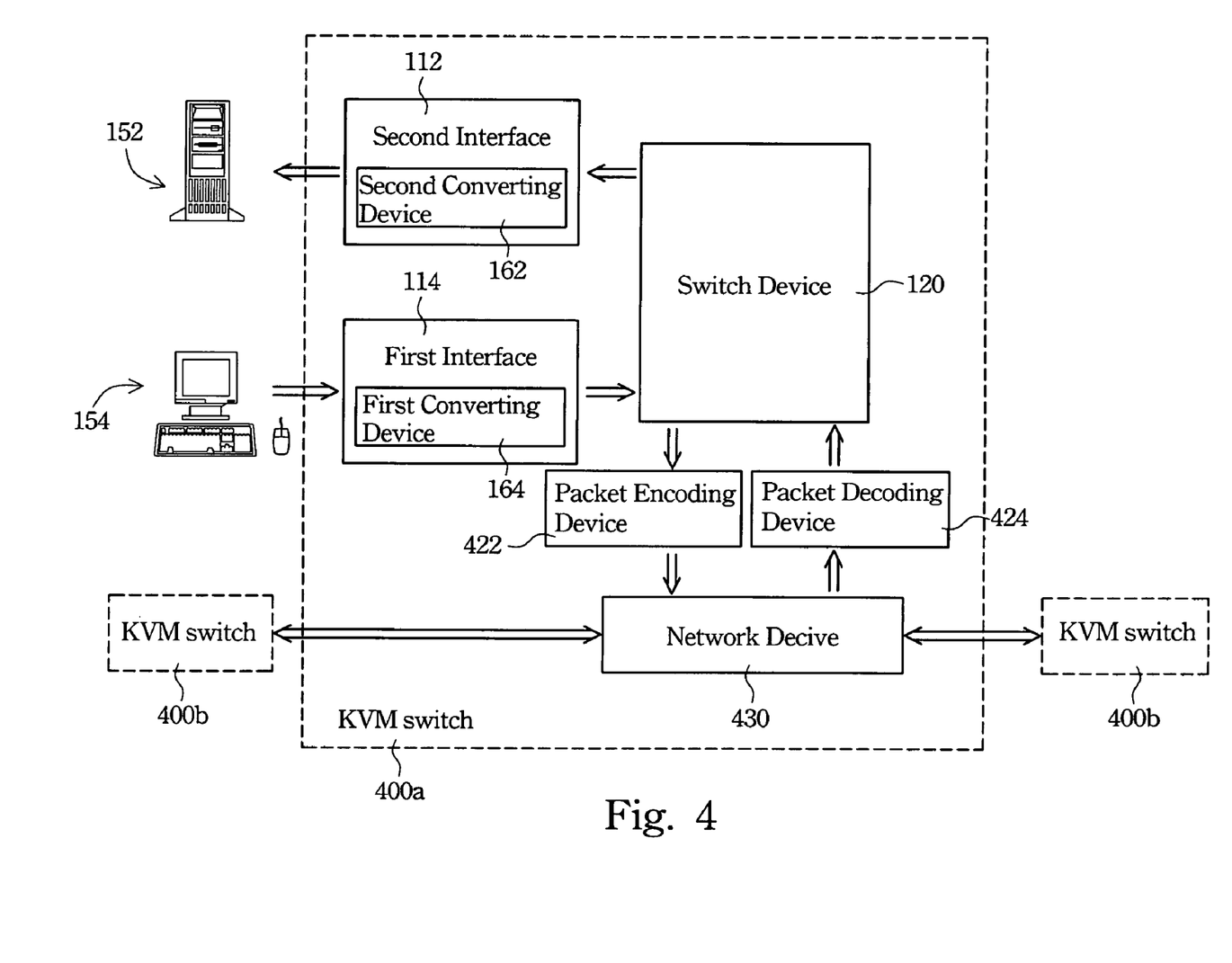
FIG. 4 is a schematic view of another embodiment of the invention.

As another embodiment shown in FIG. 4, the KVM switch 400a uses several second interfaces 112 (e.g. USB, COM, PS/2, infrared, Bluetooth, and other wired or wireless interfaces) to connect several local computers 152 and uses several first interfaces 114 (e.g. USB, COM, PS/2, infrared, Bluetooth, and other wired or wireless interfaces) to connect several local manipulating devices 154, such as the keyboard and mouse. For demonstration purposes, we draw only one first interface 114 and one second interface 112 in FIG. 4.

Similar to the previous embodiment, the first interface 114 further has a first converting device 164 to convert local electrical signals into standard packets in order for the switch device 120 to arrange path routing. The second interface 112 has a second converting device 162 to convert the standard packet into electrical signals with the same connection agreement as the local computer 152 of its destination before sending to the local computer 152.

According to the path selection setting, when the path destination of the local electrical signals is a local computer 152, the switch device 120 (e.g. a switch chip, programmable chip or CPU) transmits the local electrical signals to the second interface 112 of its destination before sending to the local computer 152. When the path destination of the local electrical signals is a remote computer, such as one connecting to another KVM switch 400b, the switch device 120 transmits the local electrical signals to the packet encoding device 422.

The packet encoding device 422, such as a programmable chip or CPU, generates according to the local electrical signals at least one network packet having several data sections correspondingly storing the local electrical signals received by the first interfaces 154.

The network device 430 establishes communications with the network devices of other KVM switches 400b using a network protocol, such as the Ethernet or wireless network protocol, to transmit network packets generated by the packet encoding device 422 and to receive those transmitted by another KVM switch. The packet decoding device 424, such as a programmable chip or CPU, decodes the network packet transmitted from another KVM switch 400b to obtain at least one remote electrical signal. The switch device 420 distributes the remote electrical signal according to the path selection setting to the second interface 112 of its destination before sending it to the local computer 152 of its destination.

Figure 5:
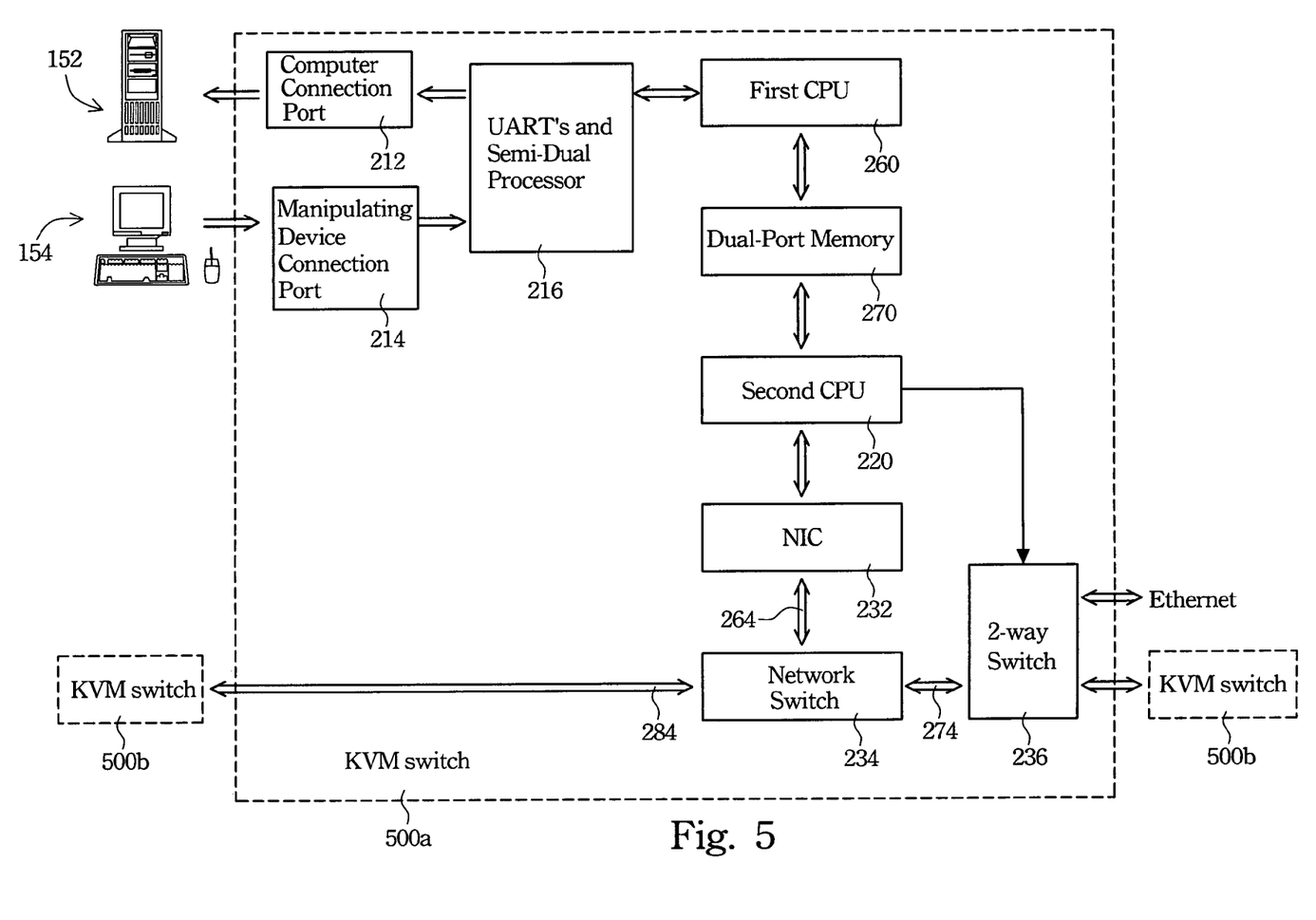
FIG. 5 is a schematic view of FIG. 4 implemented in practice.

In FIG. 5, several second interfaces 112 connect to several local computers 152 via several computer connection ports 212. The connection agreement of each of the computer connection ports 212 is the same as that of the connected local computer 152. Several first interfaces 114 connect to several local manipulating devices 154 via several manipulating device connection ports 214. The connection agreement of each of the manipulating device connection ports 214 is the same as that of the connected local manipulating device 154. For demonstration purposes, we draw only one manipulating device connection port 214 and computer connection port 212 in FIG. 5.

The electrical signals between the local computer 152 and the KVM switch 500a are transmitted using a set of universal asynchronous receivers/transmitters (UART's) and half-duplex communication processor 216. The electrical signals between the local manipulating devices 154 and the KVM switch 500a are also transmitted using the same set of universal asynchronous receivers/transmitters (UART's) and half-duplex communication processor 216.

The KVM switch 500a in the preferred embodiment can simultaneously connect to 32 local computers 152 and four local manipulating devices 154. That is, the KVM switch 500a has 32 computer connection ports 112 and 4 manipulating device connection ports 114. Therefore, it requires four 9-port UART's and one half-duplex communication processor for electrical signal transmissions. The half-duplex communication processor can be replaced by a more expensive full-duplex communication processor or some other suitable processor.

The manipulating device connection port 214 is the first converting device 164 while the computer connection port 212 is the second converting device 162. The CPU of them processes conversions between electrical signals and standard packet that have different connection agreements. The standard packet complies with the predetermined connection agreement, such as the USB connection agreement, or manufacturer defined format. This unifies the connection agreement used in the KVM switch 200. The data transmission speed and efficiency can also be increased through appropriate designs.

Moreover, the preferred embodiment provides a first CPU 260 and a dual-port memory 270 in order to quickly process data exchanges between the manipulating device connection port 214, the computer connection port 212 and the second CPU 220. All the data from the manipulating device connection port 214 and the computer connection port 212 are transmitted via the dual-port memory in a parallel format. That is, all data can individually and simultaneously pass the dual-port memory 270.

The switch device 120 uses the second CPU 220 to arrange the path routing of the standard packet according to a path selection setting (e.g. a routing table) stored in a storage medium. The second CPU 220 transmits the standard packet to the local computer 152 of the destination. Afterwards, the standard packet is transmitted via the UART's and half-duplex communication processor 216 to the computer connection port 212 of its destination. After being converted into electrical signals complying with the connection agreement of the local computer 152 of its destination, it is further transmitted to the local computer 152 of its destination.

When the path destination of the electrical signals is a remote computer, the second CPU 220 performs packet encoding. At least one network packet with several data sections correspondingly storing the standard packets of the manipulating device connection ports 214 is generated according to the standard packet. The standard packet is transmitted to the network device 430.

The network device 430 includes a network interface chip (NIC) 232 and a network switch 234 to transmit the network packets generated by the second CPU 220 and to receive those transmitted by another KVM switch 500*b*. The network switch 234 has a first port 264, a second port 274, and a third port 284, where the first port 264 connects to the NIC 232 whereas the second port 274 and the third port 284 can connect to another KVM switch 500*b*.

According to the preferred embodiment, the network device 430 further contains a 2-way switch 236 connected to the second port 274 for selecting between the Ethernet and another KVM switch 200*b*. The 2-way switch 236 is controlled by the second CPU 220. When the 2-way switch switches to the Ethernet, the KVM switch 500*a* can download new firmware via the Ethernet for update. A remote manager can also manage and monitor the KVM switch 500*a* or keep track of its operation record via the Ethernet.

In the preferred embodiment, the KVM switch is set in such a way that when it is connected with several KVM switches, the 2-way switch of the first KVM switch is connected to the Ethernet while others connected with one another. The firmware downloaded via the first KVM switch is forwarded to other KVM switches. The transmissions and reception of the network packets are performed following the Ethernet protocol. However, people skilled in the art can use other settings or network protocols without departing from the spirit and scope of the invention.

After the network switch 234 receives a network packet from another KVM switch 500*b*, the NIC 232 transfers the network packet to the second CPU 220. The second CPU 220 obtains from the network packet at least one remote electrical signal whose path destination is a local computer 152. Therefore, the second CPU 220 transmits the remote electrical signal to the computer connection port 212 of the destination and to the local computer 152 of the destination according to the path selection setting.

Likewise, the second CPU 220 first transmits the remote standard packet to the first CPU 260 and the dual-port memory 270. Afterwards, the standard packet is transmitted to the computer connection port 212 of its destination via the UART's and half-duplex communication processor 260. After being converted by the computer connection port 212 into the electrical signals complying with the connection agreement of the local computer 152 of its path destination, the electrical signals are transmitted to the local computer 152.

Besides, the functions of the switch device 120, the packet encoding device 122, and the packet decoding device 124 in the preferred embodiment are implemented using the same second CPU 220. Thus, the devices in the current embodiment are not necessarily implemented independently. When the operating clock of the CPU is fast enough, one may even use a single CPU to achieve the functions of the second CPU 220, the first CPU 260, and the dual-port memory 270. That is, these devices can share one or several programmable chips or CPU's using an appropriate program.

Figure 6:
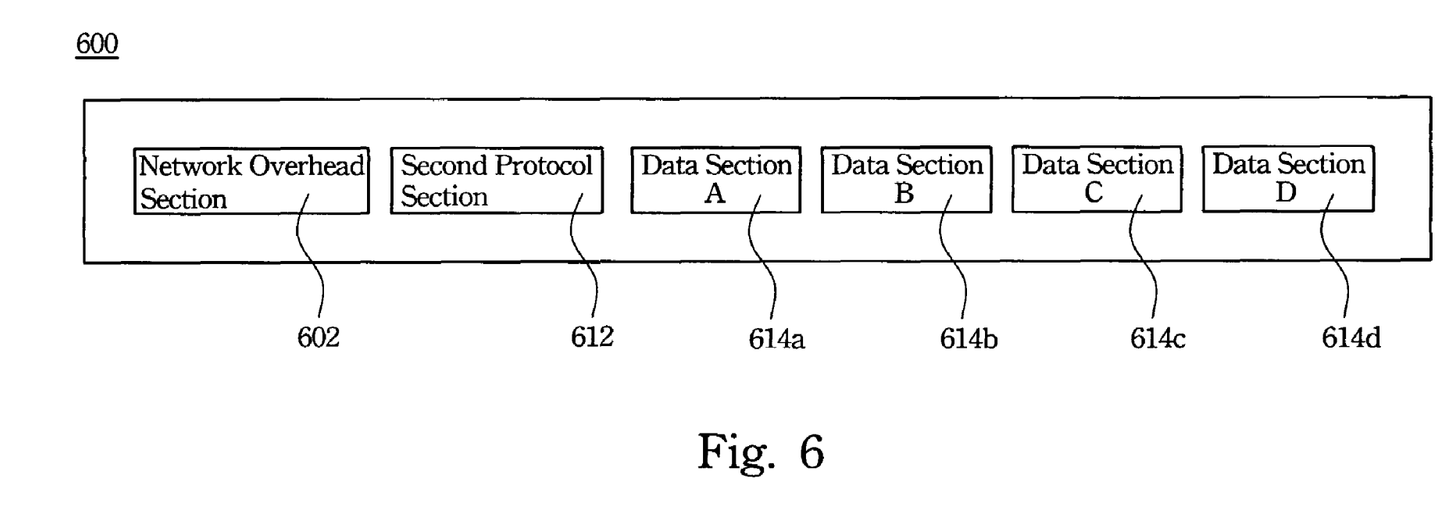
FIG. 6 is a schematic view of the network packet in FIG. 5.

As shown in FIG. 6, the KVM switch 500*a* can simultaneously connect to four local manipulating devices 154. Therefore, the network packet 600 has four data sections 614*a*, 614*b*, 614*c*, 614*d* correspondingly storing the standard packets of the manipulating device connection ports 214. The contents of each data section are the first protocol section 302 and the standard data section 304 of each standard packet.

The connection agreement or format of the electrical signals of each manipulating device connection port 214 is converted and unified by the first converting device 164 and the second converting device 162 into several standard packets with a single connection agreement. When encoding the standard packet of each manipulating device connection port 214 into data sections, different procedures are done to different connection agreements. Therefore, the invention can greatly reduce the design difficulty and production costs of the packet encoding device 422, the packet decoding device 424, the network device 430, and the software.

Moreover, the network packet 600 further contains a network overhead section 602 and a protocol section 612. Under the Ethernet protocol used herein, the network overhead section 602 stores the Ethernet overhead, such as the NIC address. The protocol section 612 stores the protocol codes, defining the packet protocol of the network packet 600.

In the preferred embodiment, when two or more local manipulating devices 154 access remote computers that connect to the same other KVM switch 500*b*, the electrical signals of the local manipulating devices 154 are encoded and stored in the same network packet. The electrical signals from two or more different local manipulating devices 154 are transmitted using the same network packet such that no signal delay occurs to the remote computers connecting to the same other KVM switch 500*b*.

The KVM switch in the current embodiment uses its network device to connect to others in order to communicate with more manipulating devices and computers. Since the electrical signals of different connection agreements or formats are converted into a standard packet using one single connection format, one does not need to have different procedures when encoding the standard packet into the data sections. This can greatly reduce the design difficulty and production costs of the packet encoding device, the packet decoding device, the network device, and the software.

The network device can include cheap NIC's and network switches, connecting to the network devices of other KVM switches using a technically mature and unified network protocol. In addition to lowering the design and production costs, the KVM switch can more easily and directly connect to the external network environment, facilitating firmware upgrades. It further enables managers to directly manage and monitor the KVM switch or keep track of its operation record via the network.

Furthermore, the preferred embodiment uses a network packet to transmit electrical signals of remote computers with path destinations being connected to the same KVM switch. This prevents the problem of signal delay as in the prior art due to sorting and waiting. This enables multiple KVM switches connected together to rapidly exchange data, increasing the efficiency and extensibility of the KVM switches.

Certain variations would be apparent to those skilled in the art, which variations are considered within the spirit and scope of the claimed invention.

What is claimed is:

1. A keyboard video mouse (KVM) switch for a plurality of computers to share a plurality of manipulating devices with different connection agreements, the KVM switch comprising:
   a plurality of first interfaces connected to the manipulating devices to receive a plurality of first electrical signals, where each of the electrical signals complies with a source connection agreement of its source manipulating device and each of the first interfaces has a first converting device to convert the first electrical signals into standard packets;
   a switch device, which arranges the routing of the standard packets between the manipulating devices and the computers according to a path selection setting; and
   a plurality of second interfaces connected to the computers, where each of the second interfaces has a second converting device to convert the standard packets received from the switch device into a second electrical signal complying with a destination connection agreement of the connected computer, wherein at least one of the source connection agreements is different from at least one of the destination connection agreements.

2. The KVM switch of claim 1, wherein each of the electrical signals is selected from the group comprising a keyboard signal and a mouse signal.

3. The KVM switch of claim 1, wherein the KVM switch allows a plurality of local and remote computers to share a plurality of local manipulating devices, further comprising:
   a packet encoding device, which generates according to the standard packet at least one network packet with a plurality of data sections correspondingly storing the standard packets of the first interfaces;
   a network device, which establishes communications with the network device of another KVM switch using a network protocol for transmitting/receiving the network packet to/from another KVM switch; and a packet decoding device, which decodes the network packet transmitted from another KVM switch to obtain at least one remote standard packet.

4. The KVM switch of claim 3, wherein the network packet further has a network overhead section.

5. The KVM switch of claim 3, wherein the packet encoding device contains a CPU.

6. The KVM switch of claim 3, wherein the packet decoding device contains a CPU.

7. The KVM switch of claim 3, wherein the network device contains:
   a network interface chip (NIC), which connects to the packet encoding device and the packet decoding device; and
   a network switch, which has a first port, a second port, and a third port, where the first port connects to the NIC and one of the second port and the third port connects to another KVM switch.

8. The KVM switch of claim 7, wherein the network device further contains a 2-way switch connected to the second port for selecting between an Ethernet and another KVM switch.

9. The KVM switch of claim 1, wherein the first interfaces contain a plurality of universal asynchronous receivers/transmitters (UART's), a half-duplex communication processor, and a CPU.

10. The KVM switch of claim 1, wherein the second interfaces contain a plurality of universal asynchronous receivers/transmitters (UART's), a half-duplex communication processor, and a CPU.

11. The KVM switch of claim 1, wherein the switch device contains a CPU.

12. A computer keyboard video mouse (KVM) switching method having a KVM switch for a plurality of computers to share a plurality of manipulating devices with different connection agreements, the KVM switching method comprising the steps of:
   receiving first electrical signals of the manipulating devices, each of the first electrical signals complying with a source connection agreement of its source manipulating device; converting each of the first electrical signals into standard packets; routing the standard packets between the manipulating devices and the computers; and converting each of the standard packets into a second electrical signal complying with a destination connection agreement of the computer of its path destination, wherein at least one of the source connection agreements is different from at least one of the destination connection agreements.

13. The method of claim 12, wherein each of the first electrical signals is selected from the group comprising a keyboard signal and a mouse signal.

14. The method of claim 12, wherein each of the first electrical signals is converted to the standard packet using a CPU.

15. The method of claim 12, wherein each of the standard packets is converted to the second electrical signal using a CPU.

16. The method of claim 12, wherein the paths of the standard packets are switched by a CPU according to a path selection setting.

17. The method of claim 12, wherein a plurality of local and remote computers shares a plurality of local manipulating devices, further comprising the steps of:
   distributing the standard packets, wherein the standard packets are transmitted to the corresponding local computers when the path destinations of the standard packets are the local computers whereas at least one network packet with a plurality of data sections correspondingly storing the standard packets is generated according to the standard packets when the path destinations thereof are the remote computers;
   establishing communications among the KVM switches using a network protocol for transmitting/receiving the network packet to/from another KVM switch;
   decoding the network packet transmitted from another KVM switch to obtain at least one remote standard packet; and
   converting the remote standard packet into the second electrical signal complying with the connection agreement of the local computer of its path destination.

18. The method of claim 17, wherein the network packet has a network overhead section.

19. The method of claim 17, wherein the standard packets are encoded in a single network packet when the path destinations of the standard packets are the remote computers connected to a same remote KVM switch.

20. The method of claim 17, wherein the communications among the KVM switches are established using a network interface chip (NIC) and a network switch configured for each of the KVM switches.

21. The method of claim 17, wherein the network packet is encoded and decoded using a CPU.

* * * * *

UNITED STATES PATENT AND TRADEMARK OFFICE
CERTIFICATE OF CORRECTION

PATENT NO. : 7,613,854 B2  Page 1 of 1
APPLICATION NO. : 10/824493
DATED : November 3, 2009
INVENTOR(S) : Sun-Chung Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1538 days.

Signed and Sealed this

Nineteenth Day of October, 2010

David J. Kappos
*Director of the United States Patent and Trademark Office*